(12) United States Patent
Grgic et al.

(10) Patent No.: US 8,250,279 B2
(45) Date of Patent: Aug. 21, 2012

(54) CONSTITUTING A CONTROL SYSTEM WITH VIRTUAL AND PHYSICAL BACKPLANES AND MODULES AS BUILDING BLOCKS

(75) Inventors: Richard J. Grgic, Painsville, OH (US); Subbian Govindaraj, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 653 days.

(21) Appl. No.: 12/428,883

(22) Filed: Apr. 23, 2009

(65) Prior Publication Data

US 2010/0274942 A1 Oct. 28, 2010

(51) Int. Cl.
*G06F 13/00* (2006.01)
(52) U.S. Cl. .......................... 710/306; 710/305; 370/395
(58) Field of Classification Search .......... 710/301–306; 370/395
See application file for complete search history.

(56) References Cited

U.S. PATENT DOCUMENTS

| 7,002,961 B1 * | 2/2006 | Lane et al. ................ 370/395.1 |
| 2003/0135685 A1 | 7/2003 | Cowan |
| 2006/0195620 A1 | 8/2006 | Arndt et al. |
| 2007/0239912 A1 | 10/2007 | Fletcher et al. |

FOREIGN PATENT DOCUMENTS

| WO | 0227506 A2 | 4/2002 |
| WO | 0284499 A1 | 4/2002 |

OTHER PUBLICATIONS

EP Search Report dated Jul. 26, 2010 for EP Application No. 10160041.9-2212, 5 pages.

\* cited by examiner

*Primary Examiner* — Brian Misiura
*Assistant Examiner* — Kim Huynh
(74) *Attorney, Agent, or Firm* — Turocy & Watson, LLP; Raymond Speroff; John M. Miller

(57) ABSTRACT

A custom control system created based on combinations of software applications and hardware control and communication modules overlaid in a virtual backplane. The user can select the modules of interest and map them together without the loss of communications between the modules while the control system is configured and overlaid. The user can then archive the system design and implement the system with a greater level of confidence in the ability of the design to meet the requirements of the application while reducing the costs of the implementation.

25 Claims, 13 Drawing Sheets

CONSTITUTING A CONTROL SYSTEM WITH VIRTUAL AND PHYSICAL BACKPLANES AND MODULES AS BUILDING BLOCKS

TECHNICAL FIELD

The subject invention relates generally to industrial control systems, and more particularly to providing uninterrupted communications between physical control and communication modules overlaid on one or more virtual backplanes containing virtual control and communication modules.

BACKGROUND

Industrial control systems have become very modular in nature, leading to the evolution of larger control racks to house the increasing number of modules making up a typical control system. Implementing control systems requires interconnectivity between the different control modules and racks creating added complexity for the user configuring and operating the system. Larger control system enclosures are also required to house the additional racks and modules.

In addition to the greater complexity and size of the control system hardware, customer demand for greater functionality while maintaining granularity with respect to purchasing control hardware has increased the lead time and expense for control system manufacturers for developing new functionality and the associated controller modules for housing the new functionality. The industrial control system market is also demanding the flexibility to stage new control designs and configurations without the requirement of purchasing all necessary hardware to test a proposed control system design.

In another aspect, the market for industrial control systems is demanding lower overall costs for control systems, including lower costs for hardware and more flexibility to modify the control system after initial installation. The control system market is also demanding the flexibility to incorporate control and communication modules from different vendors without the expense of contracting one of the vendors to integrate the disparate control and communication modules.

In summary, the control system market is demanding a flexible control system that is not dependant on proprietary hardware and has the flexibility to allow the end user to select the control hardware platform from one vendor and control or communication modules from another while having the overall system communicate in a seamless manner.

SUMMARY

The following presents a simplified summary in order to provide a basic understanding of some aspects described herein. This summary is neither an extensive overview nor is intended to identify key/critical elements or to delineate the scope of the various aspects described herein. Its sole purpose is to present some concepts in a simplified form as a prelude to the more detailed description presented later.

The innovation includes a system and methods to bridge a physical backplane and its associated control and communication modules to a virtual backplane and its associated control and communication modules. Additionally, the system and methods provide for overlaying the physical backplane on the virtual backplane and presenting a unified system of physical and virtual control and communication modules capable of interacting with each other without specific knowledge of the nature of each module with regard to the backplane containing the module.

After overlaying the physical backplane on the virtual backplane, the modules from the respective backplanes can communicate and interact with each other as if they were in a single backplane without the requirement of special configuration or programming to provide compatibility. In another aspect, the user can overlay the physical backplane on another virtual backplane, providing another series of virtual modules that can interact with the physical modules while maintaining the interaction with previously overlaid virtual backplanes.

The innovation can be practiced with proprietary physical backplanes and generic computer busses such as a PCI bus for example. Any supported bus type backplane can overlay one or more virtual backplanes and allow seamless communication between the physical and the virtual backplane.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
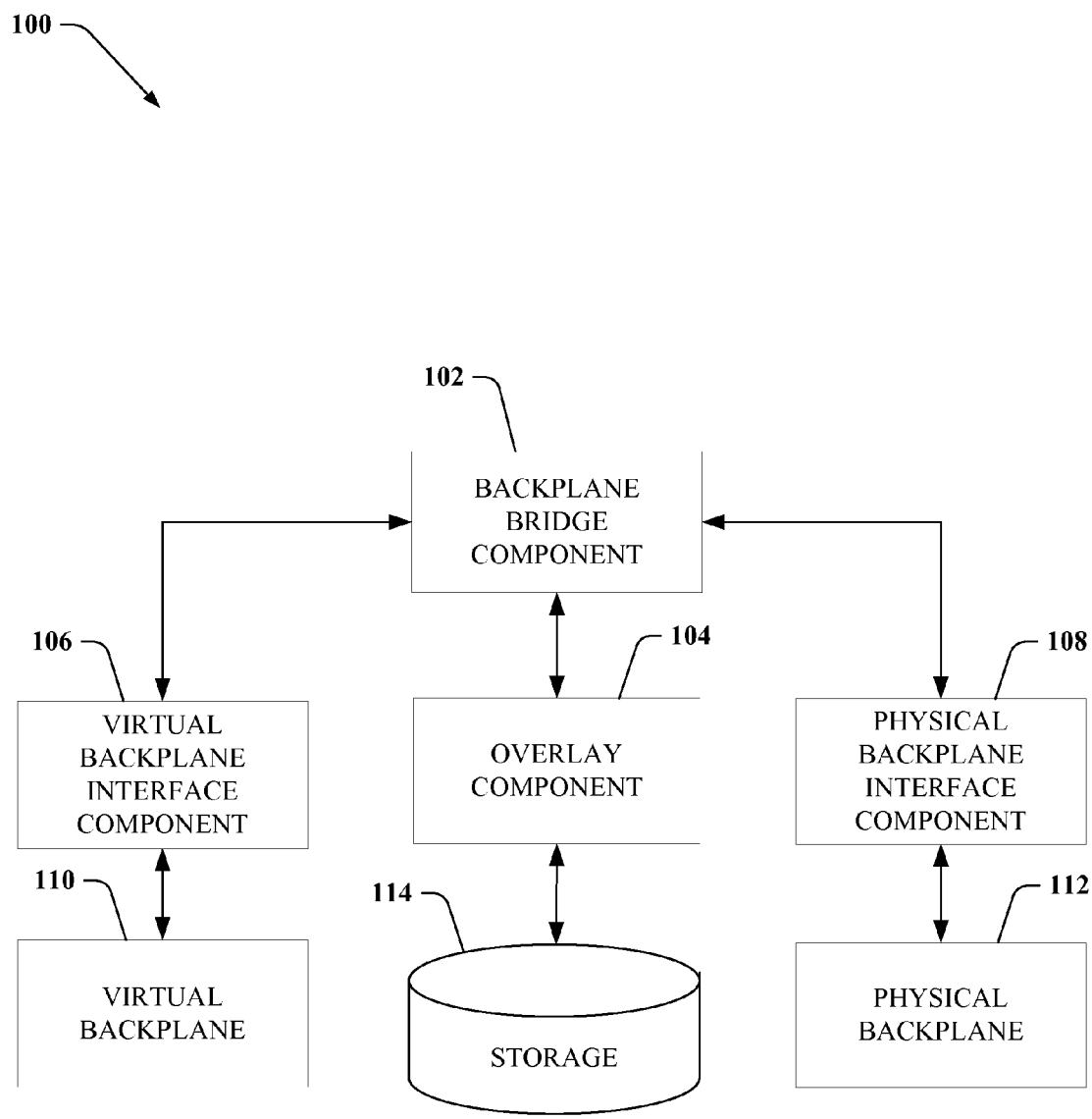
FIG. 1 illustrates an embodiment of a bridge for overlaying a physical backplane on a virtual backplane and providing seamless communications between the backplanes.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

It is noted that as used in this application, terms such as "component," "display," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Additionally, it is noted that as used in this application, terms such as "system user," "user," "operator" and the like are intended to refer to the person operating the computer-related entity referenced above.

As used herein, the term to "infer" or "inference" refer generally to the process of reasoning about or inferring states of the system, environment, user, and/or intent from a set of observations as captured via events and/or data. Captured data and events can include user data, device data, environment data, data from sensors, sensor data, application data, implicit and explicit data, etc. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is also noted that the interfaces described herein can include a Graphical User Interface (GUI) to interact with the various components for providing industrial control information to users. This can include substantially any type of application that sends, retrieves, processes, and/or manipulates factory input data, receives, displays, formats, and/or communicates output data, and/or facilitates operation of the enterprise. For example, such interfaces can also be associated with an engine, editor tool or web browser although other type applications can be utilized. The GUI can include a display having one or more display objects (not shown) including such aspects as configurable icons, buttons, sliders, input boxes, selection options, menus, tabs and so forth having multiple configurable dimensions, shapes, colors, text, data and sounds to facilitate operations with the interfaces. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

Additionally, it is also noted that the term industrial controller as used herein includes both PLCs and process controllers from distributed control systems and can include functionality that can be shared across multiple components, systems, and or networks. One or more industrial controllers can communicate and cooperate with various network devices across a network. This can include substantially any type of control, communications module, computer, I/O device, Human Machine Interface (HMI) that communicate via the network which includes control, automation, and/or public networks. The industrial controller can also communicate to and control various other devices such as Input/Output modules including Analog, Digital, Programmed/Intelligent I/O modules, other programmable controllers, communications modules, and the like. The network can include public networks such as the Internet, Intranets, and automation networks such as Control and Information Protocol (CIP) networks including DeviceNet and ControlNet. Other networks include Ethernet, Universal Serial Bus (USB) DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Referring initially to FIG. 1, a control system 100 for overlaying the control and communication modules inserted in a physical backplane 112 over the control and communication modules installed in a virtual backplane 110 creating a seamless control system providing communication between the physical and virtual modules without any modification to the physical or virtual modules or their respective backplanes. The control system 100 is comprised of a backplane bridge component 102, an overlay component 104, a virtual backplane interface component 106, a physical backplane interface component 108, a virtual backplane 110, a physical backplane 112 and a storage component 114.

The backplane bridge component 102 is communicatively connected to the virtual backplane interface component 106 and the physical backplane interface component 108 and provides the ability to interact with the physical and virtual control and communication modules installed in these respective backplanes. For example, the backplane bridge component 102 can collect information related to the number and types of modules installed in the virtual backplane interface component 106 and the physical backplane interface component 108 and deliver this information to other control system 100 components for further processing and action. It should be noted that the communication paths between the module in a virtual backplane 110 and a module in a physical backplane 112 can be different based on the direction of the communication. For example, a module in a virtual backplane 110 can communicate directly to a module in a physical backplane 112 through the virtual backplane interface component 106 and the physical backplane interface component 108 but for a module in a physical backplane 112 must use the backplane bridge component 102 as an intermediary between the virtual backplane interface component 106 and the physical backplane interface component 108.

In another aspect of the control system 100, the backplane bridge component 102 is communicatively connected to the overlay component 104. The backplane bridge component 102 can send information collected from the virtual backplane 110 and the physical backplane 112 by way of the virtual backplane interface component 106 and the physical backplane interface component 108 to the overlay component 104 for further processing and the generation of the overlay mapping.

Further, the backplane bridge component 102 is communicatively connected to the storage component 114. The backplane bridge component 102 can create bridge models reflecting the user's choice of which physical backplane 112 and which one or more virtual backplanes 110 to combine for overlaying. The backplane bridge component 102 can then archive the bridge models and other configuration information to the storage component 114.

The overlay component 104 receives information from the backplane bridge component 102 related to the user's configuration for overlaying a physical backplane 112 on one or more virtual backplanes 110. The overlay component 104 also receives information from the backplane bridge component 102 through the virtual backplane interface component 106 and the physical backplane interface component 108 related to the number and type of modules installed in the virtual backplane and the physical backplane respectively.

The overlay component 104 analyzes the received information and generates an overlay mapping of the physical control and communication modules from the physical backplane 112 and the virtual control and communication modules from the virtual backplane 110. The overlay component then presents the overlay mapping to the backplane bridge component 102 allowing the backplane bridge component 102 to create communication channels between the individual control and communication modules for communications between the modules as if they were on the same backplane. The created channels are transparent and seamless, allowing a module from one backplane to communicate with a module in another backplane without any knowledge of the difference in backplanes or any configuration changes.

The virtual backplane interface component 106 provides the communication capabilities between the backplane bridge component 102 and the virtual backplane 110. Functionality includes but is not limited to configuring the virtual backplane 110 bridge model, adding control or communication modules to the virtual backplane 110 bridge model, removing control or communication modules from the virtual backplane 110 bridge model and providing communications between the backplane bridge component 102 and the control and communication modules installed in the virtual backplane 110 and interrogating for the presence of configured control or communication modules in the virtual backplane 110.

The physical backplane interface component 108 provides the communication capabilities between the backplane bridge component 102 and the physical backplane 112. Functionality includes but is not limited to configuring the physical backplane 112 bridge models, adding control or communication modules to the physical backplane 112 bridge model, removing control or communication modules from the physical backplane 112 bridge model, providing communications between the backplane bridge component 102 and the control and communication modules installed in the physical backplane 112 and interrogating for the presence of configured control or communication modules in the physical backplane 112.

The storage component 114 provides the ability to archive preconfigured backplane bridge models, preconfigured overlay models, user configured communication parameters and system information related to the operation of the control system 100. Additionally, any databases created by the user are archived on the storage component and can be communicated to server data stores 1230 or other control system clients 1310.

In another aspect, control system 100 application data is maintained on the storage component 114 for future review with regards to creating new preconfigured control systems 100 or updating existing control systems 100. The storage component 114 can automatically transfer its database of preconfigured control systems 100 to other server data stores based on a timed schedule or on an event such as the selection of similar components at another control system 100. For example, if a user configures a parameter associated with a particular module type and archives the backplane bridge model to the storage database 114, the control system 100 can automatically update all other control systems 100 containing the preconfigured module as a default selection. In this manner, the efficiency of the overall control system design is improved because better default choices are available. If the particular module is selected at another location then the user at that location can select the preconfigured module parameters without the time consuming and costly step of analyzing the communication requirements of the selected module.

Figure 2:
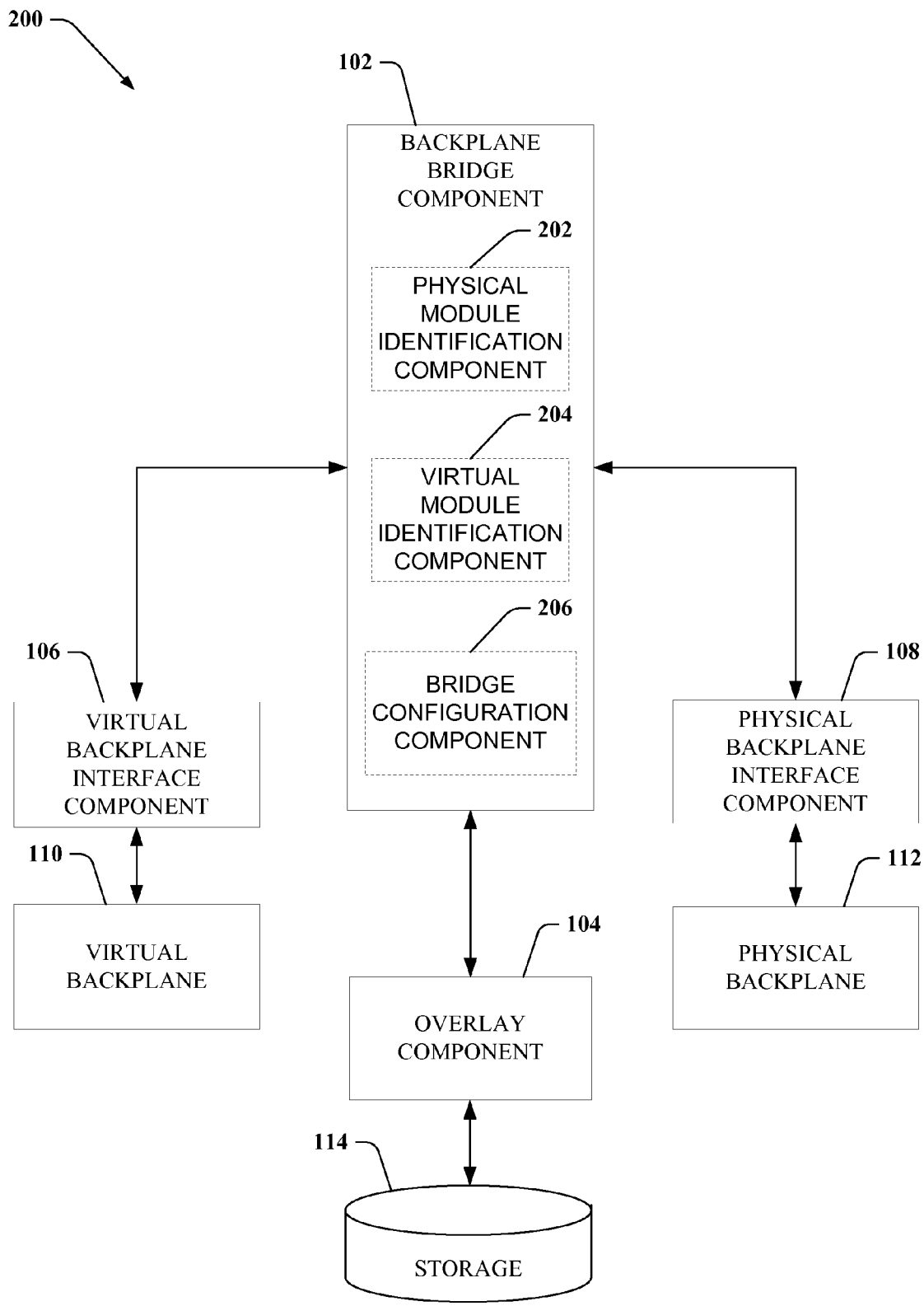
FIG. 2 illustrates an embodiment of a bridge for overlaying a physical backplane on a virtual backplane and providing seamless communications between the backplanes where a backplane bridge component provides for configuring the backplane bridge component and identifying the modules inserted in the physical backplane and the virtual backplane.

Referring next to FIG. 2, the backplane bridge component 102 includes physical module identification component 202, virtual module identification component 204 and bridge configuration component 206. The physical module identification component 202 provides the ability to enumerate the physical backplanes communicatively connected to the control system 100 through the physical backplane interface component 108. As the physical module identification component 202 enumerates each physical module in the physical backplane 112, each module is identified as to the module's type, capabilities and configuration parameters. The information collected from each identified physical module is organized and archived on the storage component 114 for later use by the control system 100.

The virtual module identification component 204 provides the ability to enumerate the virtual backplanes communicatively connected to the control system 100 through the virtual backplane interface component 106. As the virtual module identification component 204 enumerates each module in the virtual backplane 110, each virtual module is identified as to the module's type, capabilities and configuration parameters. The information collected from each identified virtual module is organized and archived on the storage component 114 for later use by the control system 100.

The bridge configuration component 206 allows the user to configure the backplane bridge component 102 with respect to the number and type of virtual backplanes 110 and physical backplanes 112 communicatively connected to the control system 100. In another aspect of the subject innovation, the bridge configuration component 206 provides the user the ability to configure the type of connectivity allowed for bridging between virtual backplanes 110 and physical backplanes 112. For example, a user can configure the bridge component to allow bridging between virtual backplanes 110 and physical backplanes on the same cabled network but not allow bridging of virtual backplanes 110 and physical backplanes 112 when one backplane is located on a cabled network and the other backplane is located on a wireless network.

Further, the bridge configuration component 206 can provide access security requiring the entry of appropriate security credentials before bridging between a virtual backplane 110 and one or more physical backplanes 112 are permitted. In another aspect, the address and or identity of a virtual backplane 110 and one or more physical backplanes can be sent to a security server for validation before the bridging operation is allowed to successfully complete.

Figure 3:
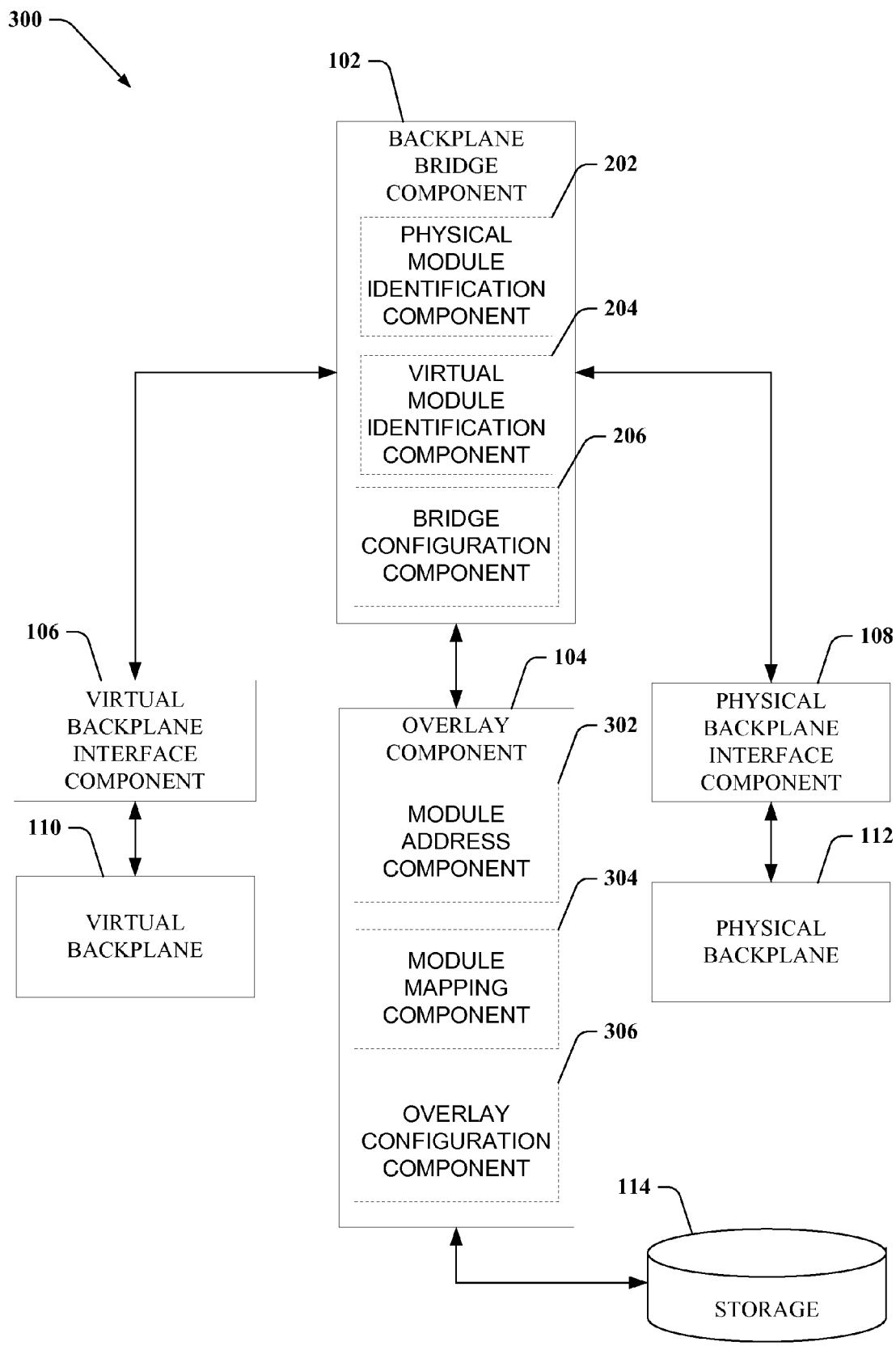
FIG. 3 illustrates an embodiment of a bridge for overlaying a physical backplane on a virtual backplane and providing seamless communications between the backplanes where an overlay component provides for configuring the overlay component and mapping the physical modules into the proper address locations of the virtual backplane.

Referring next to FIG. 3, the overlay component 104 includes a module address component 302, a module mapping component 304 and an overlay configuration component 306. The module address component 302 provides the ability for the overlay component 104 to resolve conflicts between the addresses of modules in the physical backplane 112 and the virtual modules residing in the one or more virtual backplanes 110 overlaid by the physical backplane. For example, if the module address component detects that both a physical module and a virtual module occupy slot 3 of their respective backplanes, the module address component can automatically remap the virtual module to an unoccupied slot in the virtual backplane that does not conflict with any slots in the physical backplane occupied by physical modules.

Further, module address component 302 provides two addressable ports for interaction between the physical backplane 112 and an associated virtual backplane 110. The port addressing mechanism allows modules in either backplane to communicate with modules in either backplane by selecting the port for the desired backplane and the slot for the desired module. The transition from physical backplane 112 to virtual backplane 110 and virtual backplane 110 to physical backplane 112 is handled automatically.

In another aspect, the module mapping component 304 provides for overlaying the physical modules residing in the physical backplane 112 on the virtual modules located in the virtual backplane creating a seamless combination of physical modules and virtual modules. After mapping and overlaying the modules, one module can communicate to another module by the standard addressing associated with the respective backplane. The module does not care or even have knowledge of whether the module on the other end of the communication link is a physical module in the physical backplane 112 or a virtual module in the virtual backplane 110.

Module mapping component 304 can also allow the configuration of one physical backplane 112 mapped to and overlaid on more than one virtual backplane 110. Neither the physical backplane nor the virtual backplanes are aware of the communication links between the different virtual backplanes 110 and do not require any changes to the addressing syntax to establish or perform communications between the different modules.

The overlay configuration component 306 provides for creating configurations for overlay models. The overlay configuration component 306 allows the user to select a physical backplane 112 of interest and associate the physical backplane with one or more virtual backplanes 110. After selecting the desired physical backplanes 112 and virtual backplanes 110, the overlay configuration component 306 retains the user selected mapping of physical backplanes 112 and virtual backplanes 110 as a model for implementation by the creating user or for selection by other users communicatively connected to the users system.

In another aspect of the overlay configuration component 306, the user can configure the virtual slots occupied by the virtual modules in the virtual backplane 110 after the physical modules in the physical backplane 112 are mapped into their corresponding slots in the virtual backplane 110. The user can reconfigure the virtual modules as desired and configure multiple virtual backplanes 110 to increase the number of virtual slots available for configuration.

Figure 4:
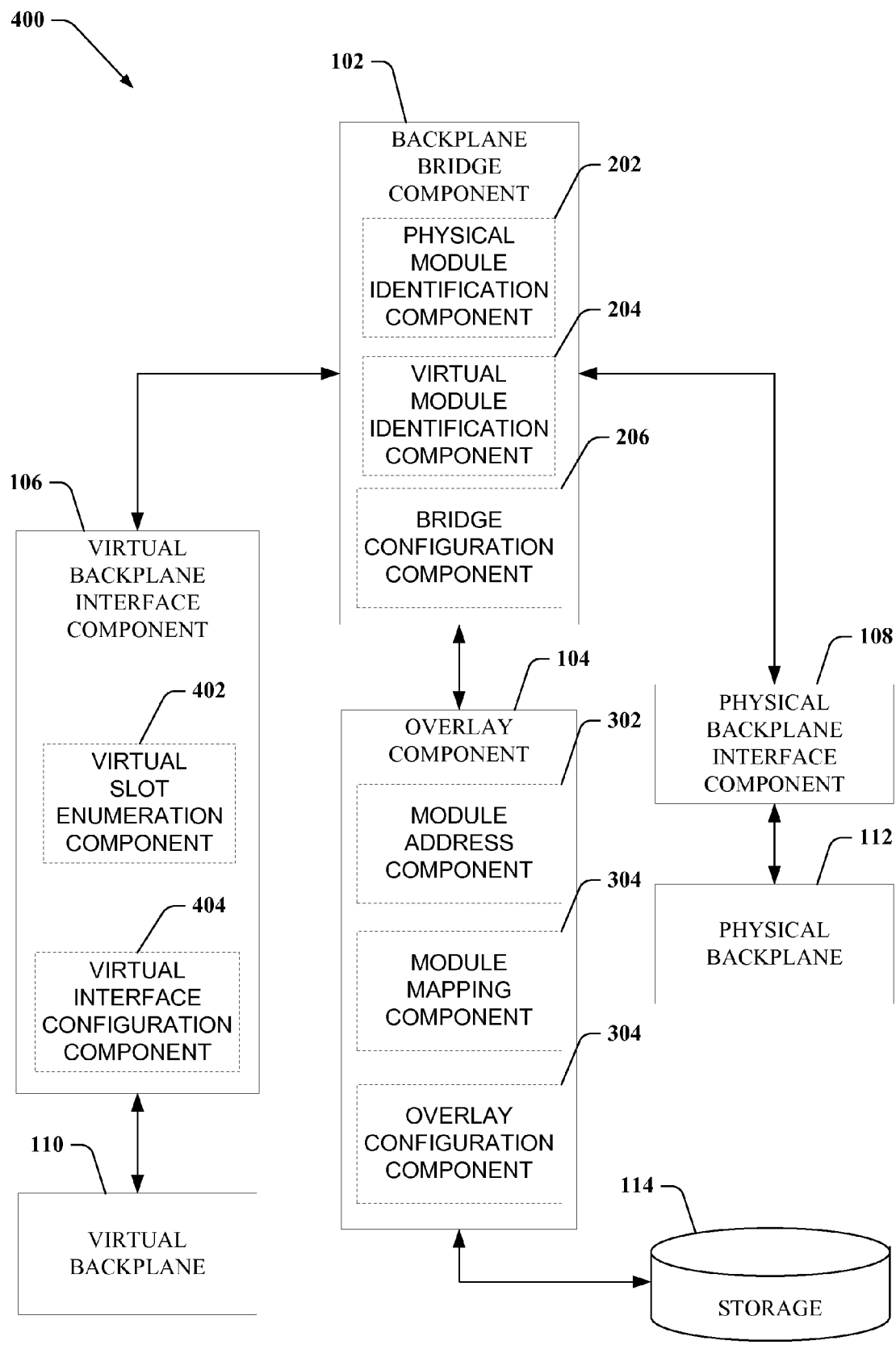
FIG. 4 illustrates an embodiment of a bridge for overlaying a physical backplane on a virtual backplane and providing seamless communications between the backplanes where a virtual backplane interface component provides configuration of the virtual backplane interface and enumeration of the virtual slots.

Returning to FIG. 4 of the drawings, the virtual backplane interface component 106 includes virtual slot enumeration component 402 and virtual interface configuration component 404. The virtual backplane interface component 106 provides the ability to configure communications with one or more virtual backplanes and support communications between the backplane bridge component 102 and the virtual backplane 110 with any of the communication protocols provided by the virtual backplane 110.

The virtual slot enumeration component 402 provides the ability to interrogate the virtual backplane 110 and determine the number of occupied slots in the virtual backplane 110 and the types of virtual modules occupying the slots. The virtual slot enumeration component 402 then provides the virtual slot status information to the backplane bridge component 102 for further processing. In another aspect, the virtual slot enumeration component 402 can detect a change in the virtual backplane 110 configuration. For example, if a user reconfigures the virtual backplane 110 by adding new virtual modules or removing existing virtual modules the virtual slot enumeration component 402 will detect the change from the current configuration and provide updated information to the backplane bridge component 102 for further processing.

The virtual interface configuration component 404 provides the ability to configure the communications interfaces between the backplane bridge component 102 and the virtual backplane 110. The virtual interface configuration component 404 allows the user the selection of one or more of the interface protocols provided by the virtual backplane 110 including but not limited to a Common Industrial Protocol (CIP) interface, a mid-range application specific integrated circuit (ASIC) emulator, a virtual backplane thin interface and directly to the virtual backplane communications driver. The user can allow one or more interfaces for each slot, allowing the applications using the virtual backplane to select the most efficient interface for their required use.

Figure 5:
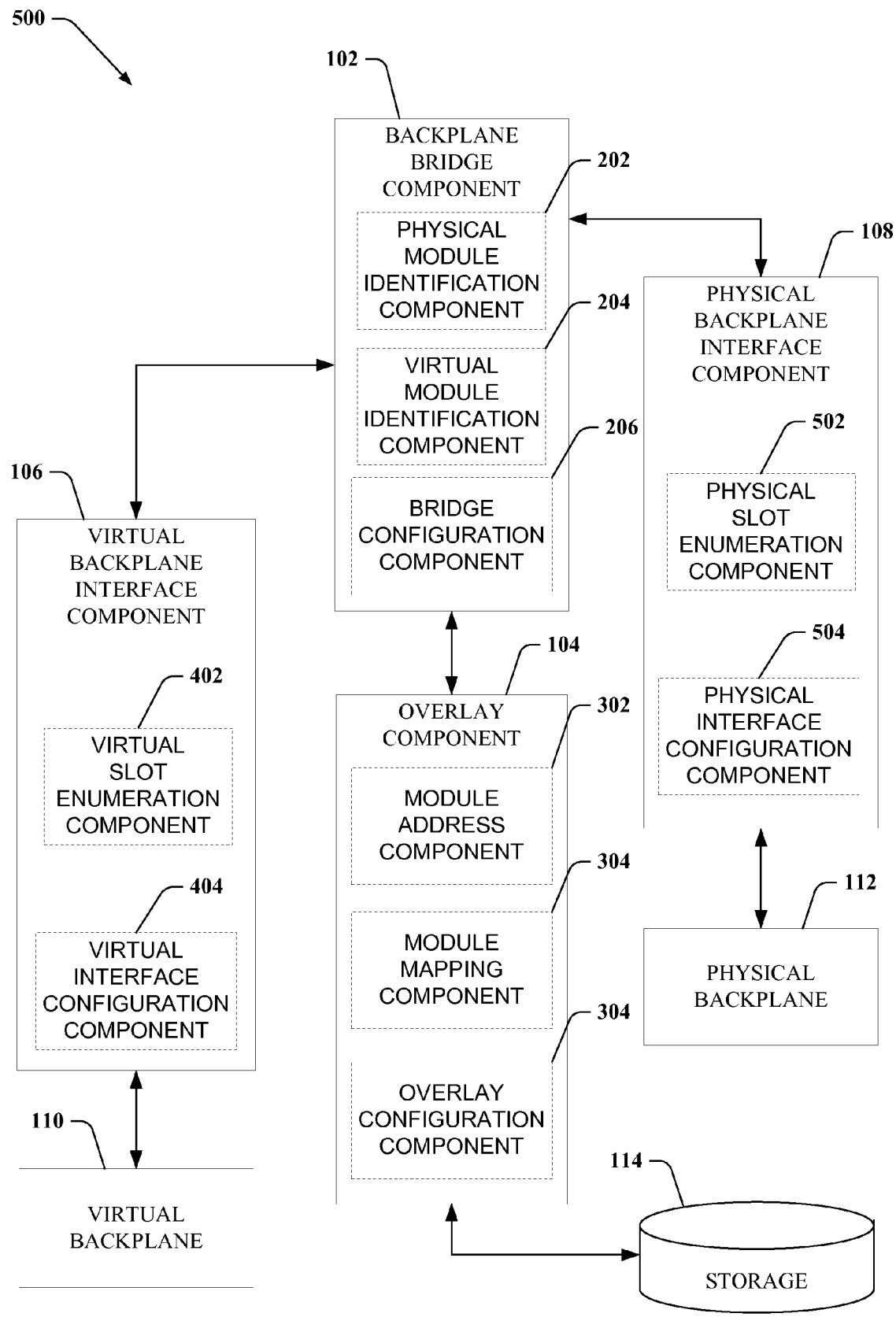
FIG. 5 illustrates an embodiment of a bridge for overlaying a physical backplane on a virtual backplane and providing seamless communications between the backplanes where a physical backplane interface component provides configuration of the physical backplane interface and enumeration of the physical slots.

Referring now to FIG. 5, the physical backplane interface component 108 includes physical slot enumeration component 502 and physical interface configuration component 504. The physical backplane interface component 108 provides the ability to configure communications a physical backplane and support communications between the backplane bridge component 102 and the physical backplane 112 with the communication protocol provided by the physical backplane 112.

The physical slot enumeration component 502 provides the ability to interrogate the physical backplane 112 and determine the number of occupied slots in the physical backplane 112 and the types of physical modules occupying the slots. The physical slot enumeration component 502 then provides the physical slot status information to the backplane bridge component 102 for further processing. In another aspect, the physical slot enumeration component 502 can detect a change in the physical backplane 112 configuration. For example, if a user reconfigures the physical backplane 112 by adding new modules or removing existing modules the physical slot enumeration component 502 will detect the change from the current configuration and provide updated information to the backplane bridge component 102 for further processing.

The physical interface configuration component 504 provides the ability to configure the communications interface between the backplane bridge component 102 and the physical backplane 112. The physical interface configuration component 504 allows the user the selection of one or more of the interface protocols provided by a physical backplane 112 and any parameters configurable based on the selected communication protocol.

Figure 6:
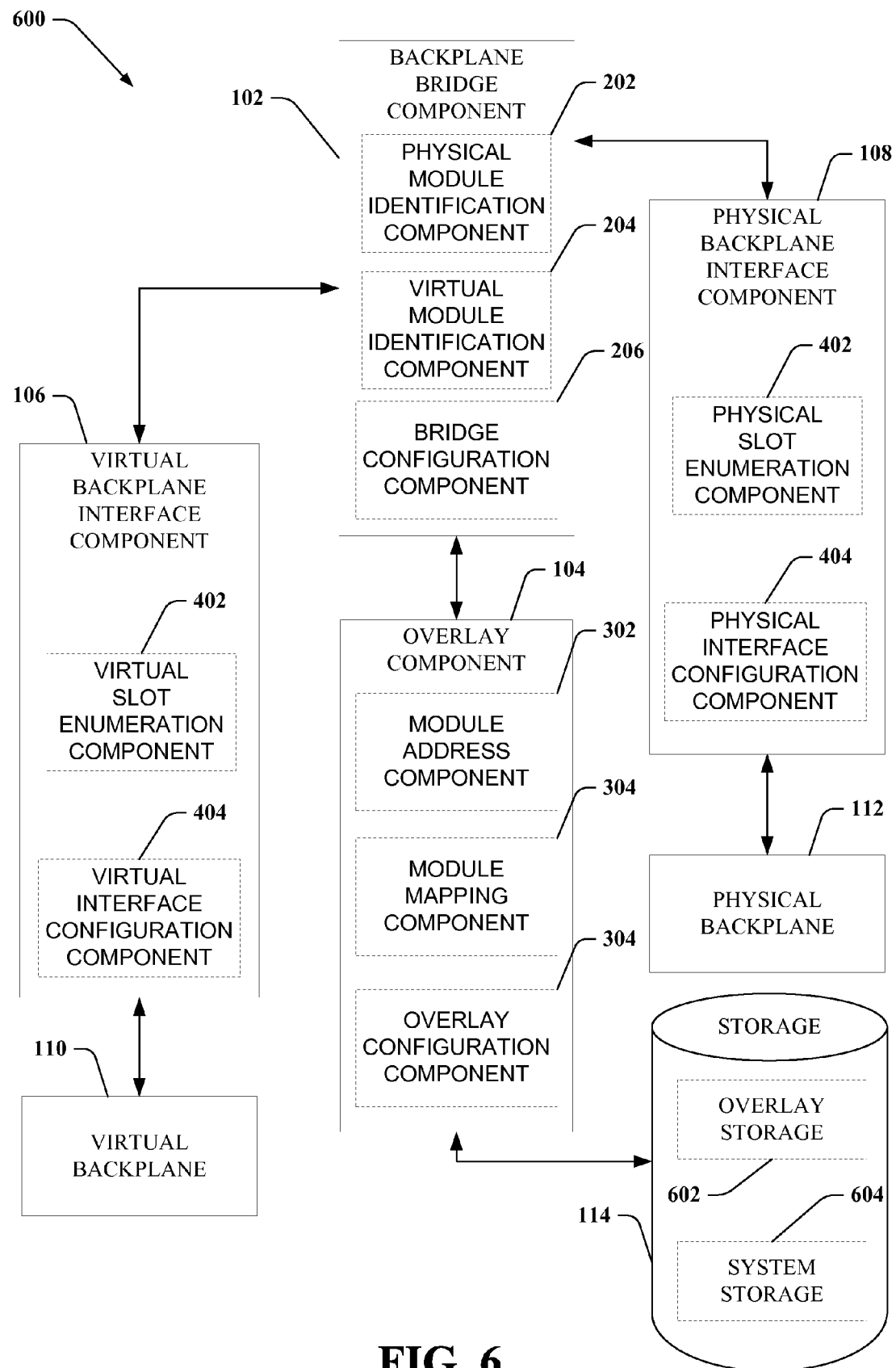
FIG. 6 illustrates an embodiment of a bridge for overlaying a physical backplane on a virtual backplane and providing seamless communications between the backplanes where a storage component provides overlay configuration storage and system storage.

Referring now to FIG. 6, the storage component 114 includes an overlay model storage component 602 and a system storage component 604. Overlay storage component 114 can be any suitable data storage device (e.g., random access memory, read only memory, hard disk, flash memory, optical memory), relational database, XML, media, system, or combination thereof. The storage component 114 can store information, programs, historical process data and the like in connection with the control system 100. In one aspect, the overlay model storage component 602 provides the capability to store a plurality of preconfigured overlay models. The preconfigured overlay models can be organized by any criteria and made available for selection by the user. For example, the user can choose a preconfigured overlay model based on the physical backplane 112 type or on a particular combination of a physical backplane 112 and virtual backplanes 110.

At the user's discretion, new overlay models can be created and stored based on changes to the layout of the control or communication system. The user can also combine multiple overlay models to create a new and larger overlay model. For example, the user can select a preconfigured virtual backplane 110 and add additional virtual modules or change the existing virtual modules. The user can then select additional virtual modules created on other control systems 100. The model storage component 602 also allows the preconfigured overlay models to be shared with server data stores 1230 or other control systems 100 through any of the communicatively connected systems.

In another aspect, the system storage component 604 provides storage for all the components required to operate the overlay system 100 and the configuration data collected based on user system modifications. As with the preconfigured overlay models, the collected configuration and system data can be shared among server data stores 1230 or other overlay systems 100. A maintenance system associated with the system storage component 604 provides for automatically backing up changed overlay models and configuration data based on a timed frequency and an indication that the system storage component 604 is reaching full capacity.

Figure 7:
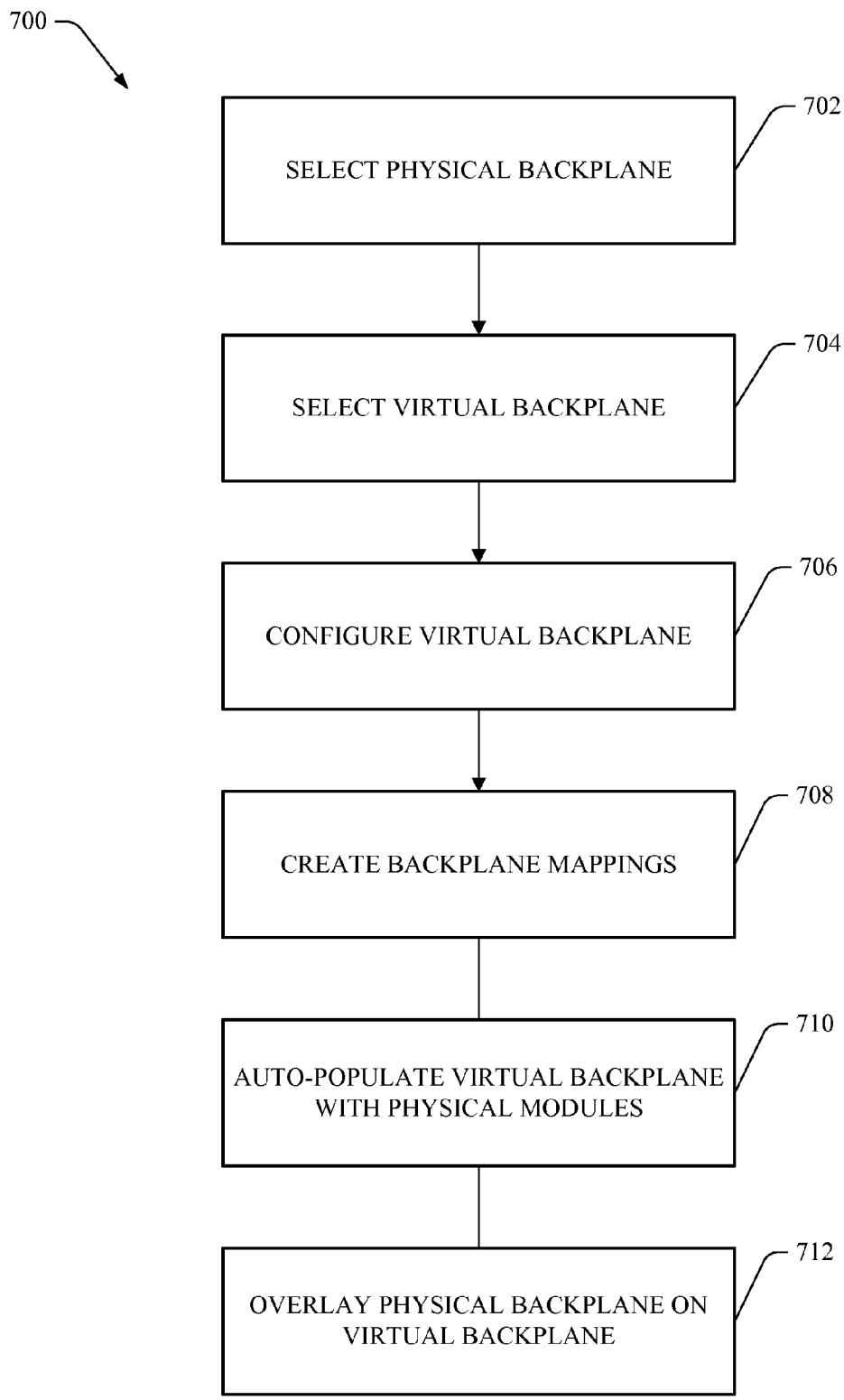
FIG. 7 illustrates a methodology of a bridge for overlaying a physical backplane on a virtual backplane and providing seamless communications between the backplanes.

Referring next to FIG. 7, a method 700 of overlaying a physical backplane 112 and its associated modules on a virtual backplane 110 and its associated modules. In a first step at 702, the user selects a physical backplane 112 from the list of physical backplanes 112 communicatively connected to the control system 100 and available to the user. Next at step 704, the user selects a virtual backplane 110 from the list of virtual backplanes 110 communicatively connected to the control system 100 and available to the user. The virtual backplane 110 can be an existing virtual backplane 110 executing on the local computer, on a computer on the network, on a control processor inserted in the physical backplane 112 or it can be a virtual backplane 110 from an archived overlay model on the storage component 114.

Next at step 706, the virtual backplane 110 is configured. Configuring the virtual backplane 110 requires detecting the virtual slots in the virtual backplane 110 occupied by virtual modules and detecting the physical slots in the physical backplane 112 occupied by physical modules. A list of occupied slot addresses per backplane type is generated and provided to step 708 for the creation of the backplane mappings. Next at step 708, the backplane mappings are created. The method 700 analyzes the lists of occupied slots for the physical and virtual backplanes 112, 110 generated in step 706 and generates a mapping strategy for overlaying the physical backplane 112 on the virtual backplane 110. In one strategy, the physical modules occupy their same slot locations in the virtual backplane 110 and any conflicting virtual modules are moved to virtual slots unoccupied by physical modules or other virtual modules.

Looking next to step 710, the virtual backplane 110 is automatically populated with the physical modules from the physical backplane based on the mapping generated in step 708. Communications between any of the modules in either backplane remains active and unaffected by the population of the virtual backplane 110 with the physical modules. Finally, at step 712, the physical backplane 112 is overlaid on the virtual backplane 110. After this step, the overlaid backplane is available for viewing as an integrated backplane reflecting all of the physical and virtual modules in a single backplane. Communications to any of the modules in the overlaid backplane is available based on their addressing associated with the overlaid backplane.

Figure 8:
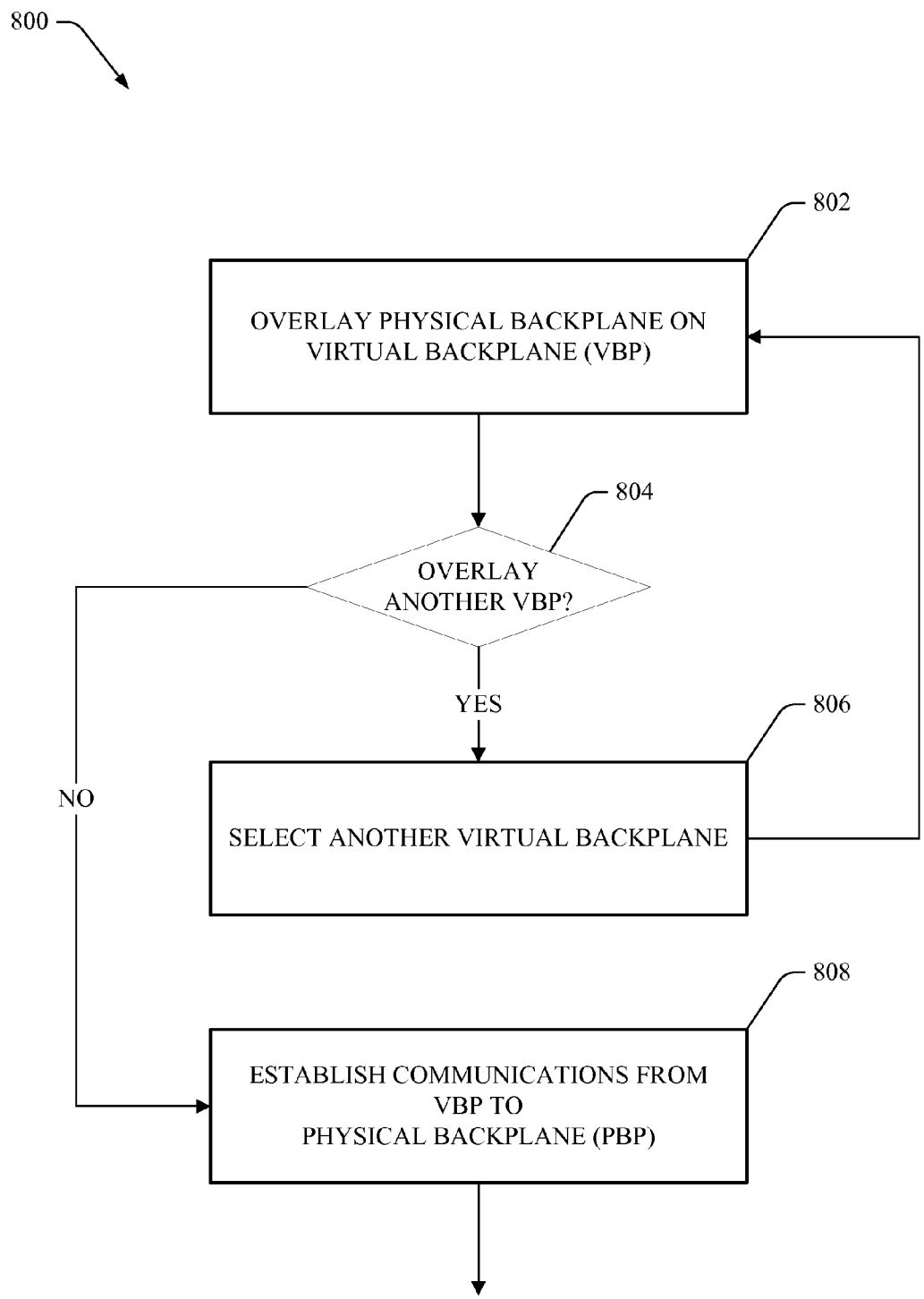
FIG. 8 illustrates a methodology of a bridge for overlaying a physical backplane on a virtual backplane and providing seamless communications between the backplanes where the physical backplane is overlaid on multiple virtual backplanes.

Referring now to FIG. 8, a method 800 of overlaying a physical backplane 112 on a plurality of virtual backplanes 110 is illustrated. Starting at step 802, the physical backplane 112 is overlaid on the first virtual backplane 110 as described by method 700. Next at step 804, the user decides if the application requires the overlaying of the physical backplane 112 on another virtual backplane 110. If the user decides to select another virtual backplane 110, then the method 800 proceeds to step 806 and another virtual backplane 110 is selected. The method 800 then returns to step 802 and overlays the physical backplane 112 on the newly selected virtual backplane 110. If the user decides not to select another virtual backplane 110, then the method 800 proceeds to step 808 and communications based on the overlaid backplanes is transferred based on any conflict mapping that occurred because of multiple modules occupying the same virtual slot. It should be noted that communications between the physical and virtual modules remains uninterrupted throughout the operation of this method.

Figure 9:
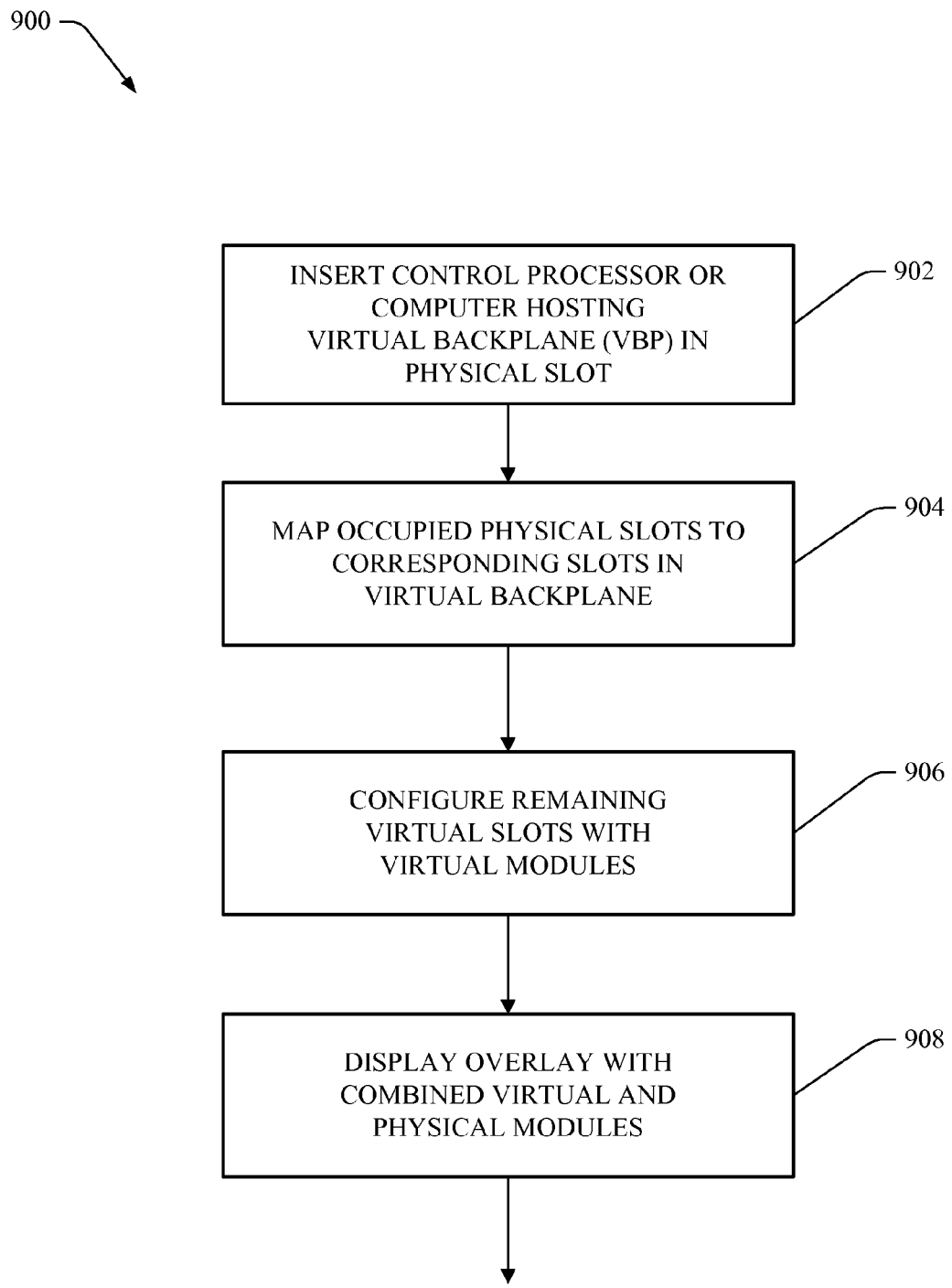
FIG. 9 illustrates a methodology of mapping modules from a physical backplane into a virtual backplane and providing addressing allowing seamless communication between the physical backplane modules and the virtual backplane modules.

Referring to FIG. 9, a method 900 of overlaying a physical backplane 112 on a virtual backplane 110 and resolving address conflicts between virtual modules from the virtual backplane 110 and physical modules from the physical backplane 112 is illustrated. In the first step of method 900, illustrated at 902, the user can insert a computing device executing the virtual backplane application into a physical slot of another computing device or a control system input/output rack. It should be noted that the computing devices must be bus compatible but that many different bus architectures are available for implementation of the physical backplane device and the virtual backplane application. For example, the computing device can be a control processor or a computer hosting a virtual backplane application. Next at step 904, the slots of the physical backplane 112 containing physical modules are mapped to the corresponding slots of the virtual backplane 110. For example, the physical module occupying slot 1 of the physical backplane is mapped to slot 1 of the virtual backplane. It should be noted that the physical module will be mapped to its corresponding slot in the virtual backplane 110 regardless of whether the virtual slot is occupied by a virtual module.

Referring next to step 906 of method 900, any virtual modules that, based on their addressing, produced conflicts with the physical modules migrated to the virtual backplane 110 are readdressed to unoccupied slots in the virtual backplane. The communication routing associated with the relocation of the virtual modules is handled automatically by the overlay component 104. Any communications between modules can continue without the requirement of readdressing applications or module communication configurations to reflect the relocated addresses. Next, at step 908, a mapping of the overlaid virtual backplane 110 and physical backplane 112 is provided to any associated display devices allowing a graphical representation of the combined virtual backplane 110 and physical backplane 112.

Figure 10:
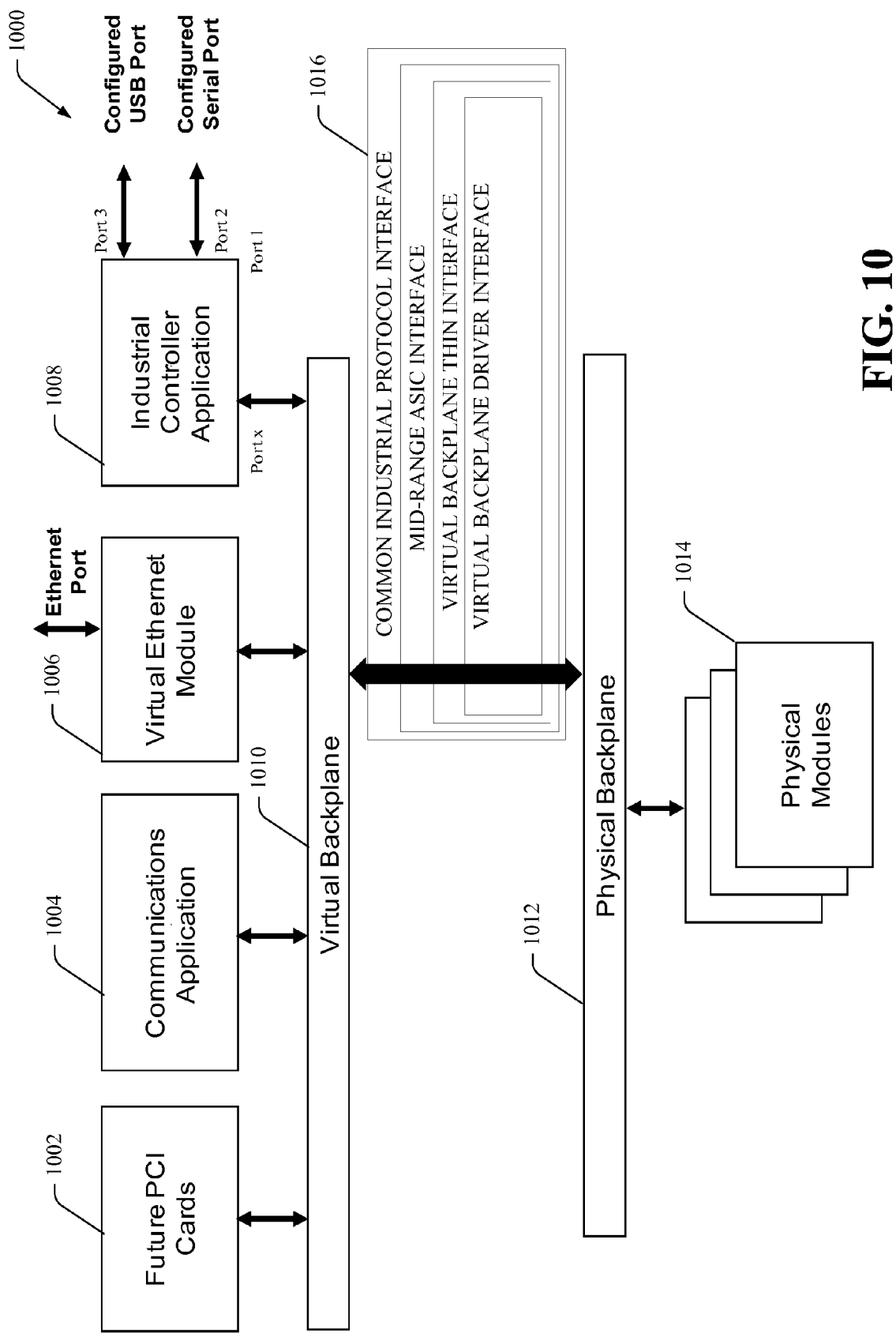
FIG. 10 illustrates an embodiment of a bridge for overlaying a physical backplane on a virtual backplane and providing seamless communications between the backplanes including exemplary virtual modules, physical modules and a physical backplane.

Referring now to FIG. 10, an embodiment of the communication aspect of the subject invention 1000 is illustrated. Future PCI cards 1002 can be mapped to the virtual backplane to allow for expansion of the capabilities of the control system 100. At 1004, an embodiment of a communication application is illustrated installed in a slot of the virtual backplane 1010. For example, a communication driver supporting the proprietary protocol of a new control system allows other virtual modules and physical modules installed in the virtual backplane 1010 and/or the physical backplane 1012 to communicate to the new control system through the multi-protocol communication interface 1016. In a similar fashion at 1006, a virtual Ethernet module allows other modules in the control system 100 to communicate over Ethernet without having a dedicated Ethernet port installed as part of their base hardware configuration. At 1008, an industrial controller application is installed in a slot in the virtual backplane 1010. An embodiment of the subject innovation allows a user to build a custom control system 100 based on the requirements of the user's application. For example, the industrial controller application can require the collection of control data from a device on a USB port through port 3, control data from another device on a serial port through port 2 and control data from physical modules 1014 installed in a physical backplane 1012.

Figure 11:
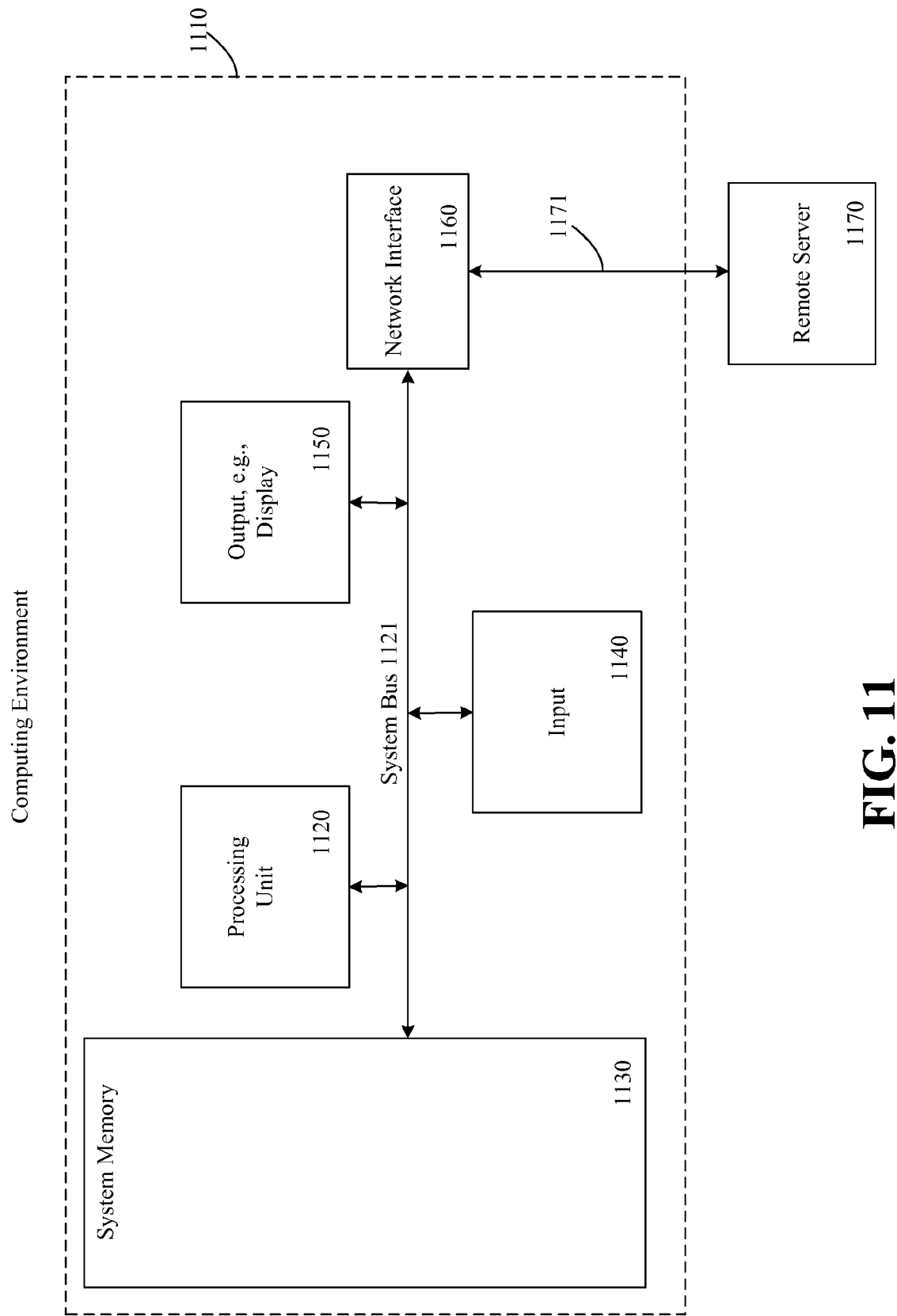
FIG. 11 illustrates an embodiment of a typical computing environment for implementing a bridge for overlaying a physical backplane on a virtual backplane and providing seamless communications between the backplanes.

FIG. 11 thus illustrates an example of a suitable computing system environment 1100 in which the claimed subject matter can be implemented, although as made clear above, the computing system environment 1100 is only one example of a suitable computing environment for a device and is not intended to suggest any limitation as to the scope of use or functionality of the claimed subject matter. Further, the computing environment 1100 is not intended to suggest any dependency or requirement relating to the claimed subject matter and any one or combination of components illustrated in the example operating environment 1100.

With reference to FIG. 11, an example of a device for implementing various aspects described herein includes a general purpose computing device in the form of a computer 1110. Components of computer 1110 can include, but are not limited to, a processing unit 1120, a system memory 1130, and a system bus 1121 that couples various system components including the system memory to the processing unit 1120. The system bus 1121 can be any of several types of bus structures including a memory bus or memory controller, a peripheral bus, and a local bus using any of a variety of bus architectures.

Computer 1110 can include a variety of computer readable media. Computer readable media can be any available media that can be accessed by computer 1110. By way of example, and not limitation, computer readable media can comprise computer storage media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media can embody computer readable instructions, data structures, program modules or other data in a modulated data signal such as a carrier wave or other transport mechanism and can include any suitable information delivery media.

The system memory 1130 can include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, can be stored in memory 1130. Memory 1130 can also contain data and/or program modules that are immediately accessible to and/or presently being operated on by processing unit 1120. By way of non-limiting example, memory 1130 can also include an operating system, application programs, other program modules, and program data.

The computer 1110 can also include other removable/non-removable, volatile/nonvolatile computer storage media. For example, computer 1110 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1221 through a non-removable memory interface such as an interface, and a magnetic disk drive or optical disk drive can be connected to the system bus 1121 by a removable memory interface, such as an interface.

A user can enter commands and information into the computer 1110 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1120 through user input 1140 and associated interface(s) that are coupled to the system bus 1121, but can be connected by other interface and bus structures, such as a parallel port, game port or a universal serial bus (USB). A graphics subsystem can also be connected to the system bus 1121. In addition, a monitor or other type of display device can be connected to the system bus 1121 via an interface, such as output interface 1150, which can in turn communicate with video memory. In addition to a monitor, computers can also include other peripheral output devices, such as speakers and/or a printer, which can also be connected through output interface 1150.

The computer 1110 can operate in a networked or distributed environment using logical connections to one or more other remote computers, such as remote server 1170, which can in turn have media capabilities different from device 1110. The remote server 1170 can be a personal computer, a server, a router, a network PC, a peer device or other common network node, and/or any other remote media consumption or transmission device, and can include any or all of the elements described above relative to the computer 1110. The logical connections depicted in FIG. 11 include a network 1171, such local area network (LAN) or a wide area network (WAN), but can also include other networks/buses. Such networking environments are commonplace in homes, offices, enterprise-wide computer networks, intranets and the Internet.

When used in a LAN networking environment, the computer 1110 is connected to the LAN 1171 through a network interface 1160 or adapter. When used in a WAN networking environment, the computer 1110 can include a communications component, such as a modem, or other means for establishing communications over the WAN, such as the Internet. A communications component, such as a modem, which can be internal or external, can be connected to the system bus 1121 via the user input interface at input 1140 and/or other appropriate mechanism. In a networked environment, program modules depicted relative to the computer 1110, or portions thereof, can be stored in a remote memory storage device. It should be appreciated that the network connections shown and described are exemplary and other means of establishing a communications link between the computers can be used.

Figure 12:
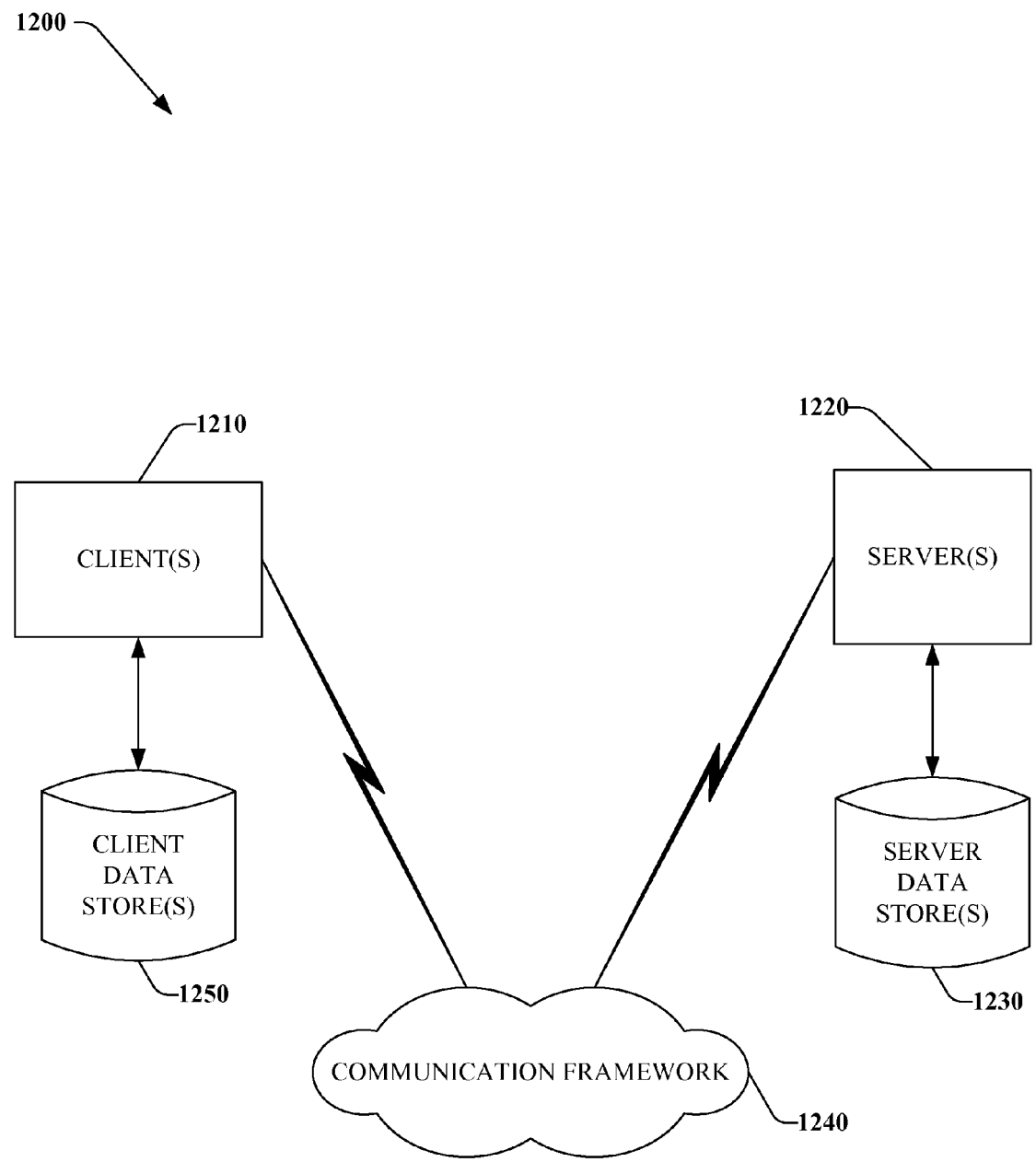
FIG. 12 illustrates an embodiment of a bridge and overlay system depicting the interaction between a bridge and overlay client and a server.

FIG. 12 is a schematic block diagram of a sample-computing environment 1200 within which the disclosed and described components and methods can be used. The system 1200 includes one or more client(s) 1210. The client(s) 1210 can be hardware and/or software (for example, threads, processes, computing devices). The system 1200 also includes one or more server(s) 1220. The server(s) 1220 can be hardware and/or software (for example, threads, processes, computing devices). The server(s) 1220 can house threads or processes to perform transformations by employing the disclosed and described components or methods, for example. Specifically, one component that can be implemented on the server 1220 is a security server. Additionally, various other disclosed and discussed components can be implemented on the server 1220.

One possible means of communication between a client 1210 and a server 1220 can be in the form of a data packet adapted to be transmitted between two or more computer processes. The system 1200 includes a communication framework 1240 that can be employed to facilitate communications between the client(s) 1210 and the server(s) 1220. The client(s) 1210 are operably connected to one or more client data store(s) 1250 that can be employed to store information local to the client(s) 1210. Similarly, the server(s) 1220 are operably connected to one or more server data store(s) 1230 that can be employed to store information local to the server(s) 1220.

Figure 13:
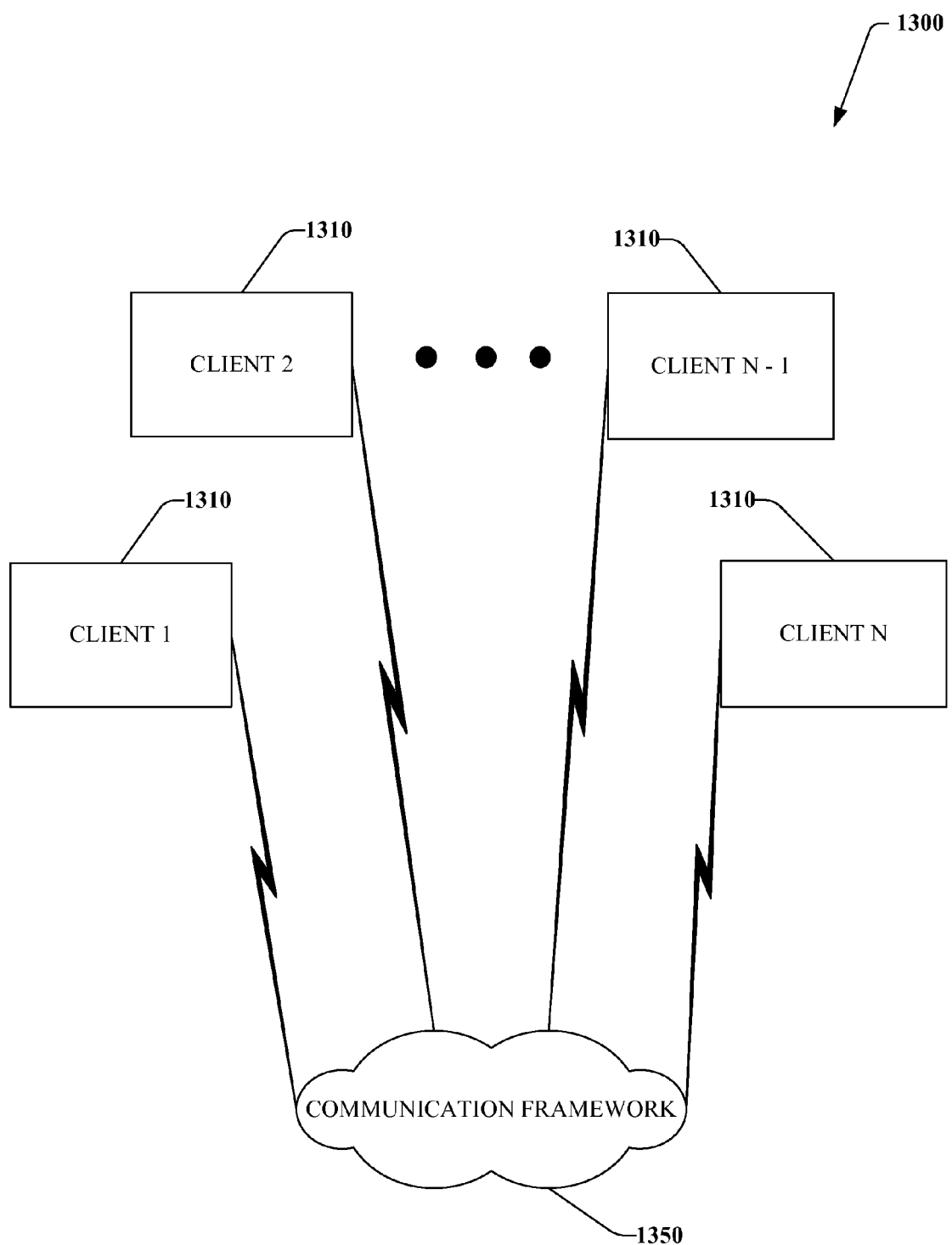
FIG. 13 illustrates an embodiment of a bridge and overlay system depicting the interaction between a bridge and multiple overlay clients.

Referring again to the drawings, FIG. 13 illustrates an embodiment of the subject innovation where a plurality of client systems 1310 can operate collaboratively based on their communicative connection. For instance, as described previously, a control system 100 can transmit an updated overlay model to a plurality of control systems 100 to share the overlay design with others. In another example, the control systems 100 can operate in a series fashion, allowing overlay model and configuration data received by control system 100 client 1 to transmit the information to control system 100 client 2 which proceeds to transfer the information to control system 100 client N−1 and in a similar fashion transmits the information to control system 100 client N where the information is ultimately transmitted to a server 1220.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

What is claimed is:

1. A system, comprising:
   a processor;
   a memory communicatively coupled to processor, the memory having stored therein computer-executable instructions, comprising:
      a backplane bridge component configured to collect backplane data describing a physical backplane overlaid on a first virtual backplane, and for the transfer of messages between the physical backplane and the first virtual backplane, wherein at least one physical module is installed in the physical backplane and at least one virtual module is installed in the first virtual backplane, wherein the virtual module is not a physical module;
      an overlay component configured to map the at least one physical module into a respective address location in the first virtual backplane;
      wherein the backplane bridge component is further configured to generate a model of the backplane data and map; and
      a storage component for archiving the model.

2. The system of claim 1, the backplane bridge component further comprises a physical module identification component configured to identify the at least one physical module based on the backplane data collected by the backplane bridge component.

3. The system of claim 1, the backplane bridge component further comprises a virtual module identification component configured to identify the at least one virtual module based on the backplane data collected by the backplane bridge component.

4. The system of claim 1, the backplane bridge component further comprises a bridge configuration component configured to enable user selection and overlaying of the physical backplane and the first virtual backplane.

5. The system of claim 1, the virtual backplane interface component further comprises a virtual slot enumeration component configured to detect applications configured as virtual modules.

6. The system of claim 1, wherein the physical backplane is overlaid on a second virtual backplane and the backplane bridge component configured to collect additional backplane data describing the physical backplane overlaid on the second virtual backplane, and for the transfer of messages between the physical backplane, the first virtual backplane, and the second virtual backplane.

7. The system of claim 1, wherein the virtual backplane interface component comprises a virtual interface configuration component configured to enable multiple communication protocols for use by the backplane bridge component in communicating with virtual modules installed in the first virtual backplane.

8. The system of claim 7, wherein the virtual interface configuration component is further configured to enable a least two of the virtual modules to employ a different communication protocol from each other, of the multiple communication protocols.

9. The system of claim 7, wherein the multiple communication protocols comprise at least two of a common industrial protocol interface, a mid-range application specific integrated circuit interface, a virtual backplane thin interface, or a virtual backplane communications driver interface.

10. The system of claim 1, the physical backplane interface component further comprises a physical slot enumeration component configured to detect the presence of physical modules inserted in slots of the physical backplane.

11. The system of claim 1, wherein the physical backplane is a control system input/output rack.

12. The system of claim 1, wherein the physical backplane interface component further comprises a physical interface configuration component configured to enable user configuration of the physical backplane interface component to provide uninterrupted communications between the physical backplane and the backplane bridge component.

13. The system of claim 10, wherein the physical slot enumeration component is configured to detect type of the physical modules in the slots.

14. The system of claim 1, wherein the overlay component further comprises a module address component configured to resolve a virtual backplane address conflict between the at least one physical module in the physical backplane and the at least one virtual module having an overlapping address location in the first virtual backplane.

15. The system of claim 1, wherein the module address component resolve the virtual backplane address conflict by changing address location of the at least one virtual module to an address location in the first virtual backplane that does not conflict with the address location of the at least one physical module in the first virtual backplane.

16. The system of claim 14, wherein the overlay component further comprises a module mapping component configured to maintain uninterrupted communications between installed physical and virtual modules while overlaying the physical backplane on the first virtual backplane, based on user selection of at least one physical and at least one virtual backplane.

17. The system of claim 6, wherein the overlay component is further configured to map the at least one physical module into a respective address location in the second virtual backplane.

18. The system of claim 1, wherein the overlay component is further configured to automatically populate slots of the virtual backplane with physical modules occupying corresponding slots in the physical backplane.

19. A method, comprising:
   employing a processor executing computer executable instructions embodied on at least one non-transitory computer readable medium to perform operations comprising:
      collecting backplane data describing a physical backplane overlaid on a first virtual backplane, and for the transfer of messages between the physical backplane and the first virtual backplane, wherein at least one physical module is installed in the physical backplane and at least one virtual module is installed in the first virtual backplane, wherein the virtual module is not a physical module;
mapping the at least one physical module into a respective address location in the first virtual backplane;
generating a model of the backplane data and the mapping; and
storing the model.

20. The method of claim 19, further comprising resolving a virtual backplane address conflict between the at least one physical module in the physical backplane and the at least one virtual module having an overlapping address location in the first virtual backplane by changing address location of the at least one virtual module to an address location in the first virtual backplane that does not conflict with the address location of the at least one physical module in the first virtual backplane.

21. The method of claim 19, further comprising:
overlaying the physical backplane on a second virtual backplane; and
collecting additional backplane data describing the physical backplane overlaid on the second virtual backplane, and for the transfer of messages between the physical backplane, the first virtual backplane, and the second virtual backplane.

22. The method of claim 21, further comprising mapping the at least one physical module into a respective address location in the second virtual backplane.

23. A system comprising:
means for collecting backplane data describing a physical backplane overlaid on a first virtual backplane, and for the transfer of messages between the physical backplane and the first virtual backplane, wherein at least one physical module is installed in the physical backplane and at least one virtual module is installed in the first virtual backplane, wherein the virtual module is not a physical module;
means for mapping the at least one physical module into a respective address location in the first virtual backplane;
means for generating a model of the backplane data and the mapping; and
means for archiving the model.

24. The system of claim 23, further comprising:
means for resolving a virtual backplane address conflict between the at least one physical module in the physical backplane and the at least one virtual module having an overlapping address location in the first virtual backplane by changing address location of the at least one virtual module to an address location in the first virtual backplane that does not conflict with the address location of the at least one physical module in the first virtual backplane.

25. The system of claim 23, further comprising:
means for overlaying the physical backplane on a second virtual backplane;
means for collecting additional backplane data describing the physical backplane overlaid on the second virtual backplane, and for the transfer of messages between the physical backplane, the first virtual backplane, and the second virtual backplane; and
means for mapping the at least one physical module into a respective address location in the second virtual backplane.

\* \* \* \* \*